(12) United States Patent
McCormick et al.

(10) Patent No.: US 8,866,321 B2
(45) Date of Patent: Oct. 21, 2014

(54) ARTICULATED-RAFT/ROTARY-VANE PUMP GENERATOR SYSTEM

(71) Applicant: Murtech, Inc., Glen Burnie, MD (US)

(72) Inventors: Michael E. McCormick, Annapolis, MD (US); Robert Murtha, Stevensville, MD (US)

(73) Assignee: Murtech, Inc., Glen Burnie, MD (US)

( * ) Notice: Subject to any disclaimer, the term of this patent is extended or adjusted under 35 U.S.C. 154(b) by 0 days.

(21) Appl. No.: 14/022,545

(22) Filed: Sep. 10, 2013

(65) Prior Publication Data

US 2014/0091575 A1     Apr. 3, 2014

Related U.S. Application Data

(60) Provisional application No. 61/707,266, filed on Sep. 28, 2012.

(51) Int. Cl.
 *F03B 13/20*     (2006.01)

(52) U.S. Cl.
 CPC ................ *F03B 13/20* (2013.01); *Y02E 10/38* (2013.01); *F05B 2260/406* (2013.01)
 USPC .............................. 290/42; 290/53

(58) Field of Classification Search
 CPC ................................ Y02E 10/38; Y02E 10/28
 USPC ......................... 290/53, 42, 43, 54
 See application file for complete search history.

(56) References Cited

U.S. PATENT DOCUMENTS 260,016 A    6/1882   Franklin
344,813 A    7/1886   Bull (Continued)

FOREIGN PATENT DOCUMENTS

CA    1193490    9/1985
DE    2248260    4/1974

(Continued)

OTHER PUBLICATIONS

Bernitsas, et al., "VIVACE (Vortex Induced Vibration for Aquatic Clean Energy): A New Concept in Generation of Clean and Renewable Energy from Fluid Flow," Proceedings of OMAE2006, Paper OMAE06-92645, Hamburg, Germany Jun. 4-9, 2006, pp. 1-18.

(Continued)

*Primary Examiner* — Tulsidas C Patel
*Assistant Examiner* — Sean Gugger
(74) *Attorney, Agent, or Firm* — Caesar, Rivise, Bernstein, Cohen & Pokotilow, Ltd.

(57) ABSTRACT

An apparatus and method for generating electricity from ocean wave energy by using a floating device having a first portion that is movably coupled to a second portion. A hydraulic pump is coupled between these portions such that when the floating device is exposed to ocean wave energy, the hydraulic fluid within the pump is displaced. A flow rectifier is used to create a unidirectional hydraulic fluid flow that is dispensed through a rotary-vane pump which, in turn, is coupled to an electrical generator. Thus, as the rotary-vane pump is activated by the unidirectional hydraulic fluid flow, the rotary-vane pump turns the electrical generator for generating electricity. A plurality of hydraulic pumps and associated flow rectifiers, rotary-vane pumps and electrical generators can be coupled between the first and second portions. In addition, the floating device can include a third portion that is also movably coupled to the second portion and a plurality of hydraulic pumps and associated flow rectifiers, rotary-vane pumps and electrical generators can be coupled between the second and third portions.

20 Claims, 3 Drawing Sheets

(56) References Cited

U.S. PATENT DOCUMENTS

| | | | | |
|---|---|---|---|---|
| 1,078,323 | A | * | 11/1913 | Trull .............................. 417/332 |
| 1,636,447 | A | | 7/1927 | Standish |
| 2,731,799 | A | | 1/1956 | Lange et al. |
| 3,022,632 | A | | 2/1962 | Parks |
| 3,099,998 | A | * | 8/1963 | Fisher .......................... 137/855 |
| 3,120,491 | A | | 2/1964 | Kincaid |
| 3,191,202 | A | | 6/1965 | Handler |
| 3,376,588 | A | | 4/1968 | Berteaux |
| 3,628,334 | A | | 12/1971 | Coleman |
| 3,755,836 | A | | 9/1973 | Milazzo |
| 3,818,523 | A | | 6/1974 | Stillman, Jr. |
| 3,846,990 | A | | 11/1974 | Bowley |
| 3,848,419 | A | | 11/1974 | Bowley |
| 4,004,308 | A | | 1/1977 | Gongwer |
| 4,048,802 | A | | 9/1977 | Bowley |
| 4,077,213 | A | | 3/1978 | Hagen |
| 4,098,084 | A | | 7/1978 | Cockerell |
| 4,118,932 | A | | 10/1978 | Sivill |
| 4,209,283 | A | | 6/1980 | Marbury |
| 4,210,821 | A | * | 7/1980 | Cockerell ....................... 290/53 |
| 4,255,066 | A | | 3/1981 | Mehlum |
| 4,264,233 | A | | 4/1981 | McCambridge |
| 4,280,238 | A | | 7/1981 | van Heijst |
| 4,326,840 | A | | 4/1982 | Hicks et al. |
| 4,335,576 | A | | 6/1982 | Hopfe |
| RE31,111 | E | * | 12/1982 | Hagen ............................. 60/500 |
| 4,408,454 | A | | 10/1983 | Hagen et al. |
| 4,421,461 | A | | 12/1983 | Hicks et al. |
| 4,512,886 | A | | 4/1985 | Hicks et al. |
| 4,686,377 | A | * | 8/1987 | Gargos ........................... 290/53 |
| 4,698,969 | A | | 10/1987 | Raichlen et al. |
| 4,781,023 | A | * | 11/1988 | Gordon .......................... 60/506 |
| 4,894,873 | A | | 1/1990 | Kiefer et al. |
| 4,954,110 | A | | 9/1990 | Warnan |
| 5,112,483 | A | | 5/1992 | Cluff |
| 5,132,550 | A | | 7/1992 | McCabe |
| 5,186,822 | A | | 2/1993 | Tzong et al. |
| 5,359,229 | A | | 10/1994 | Youngblood |
| 5,558,459 | A | | 9/1996 | Odenbach et al. |
| 5,879,105 | A | | 3/1999 | Bishop et al. |
| 6,406,221 | B1 | | 6/2002 | Collier |
| 6,451,204 | B1 | | 9/2002 | Anderson |
| 6,476,511 | B1 | * | 11/2002 | Yemm et al. .................... 290/42 |
| 6,647,716 | B2 | | 11/2003 | Boyd |
| 6,863,806 | B2 | | 3/2005 | Stark et al. |
| 7,023,104 | B2 | | 4/2006 | Kobashikawa |
| 7,042,112 | B2 | | 5/2006 | Wood |
| 7,245,041 | B1 | | 7/2007 | Olson |
| 7,264,420 | B2 | | 9/2007 | Chang |
| 7,443,047 | B2 | | 10/2008 | Ottersen |
| 7,579,704 | B2 | | 8/2009 | Steenstrup et al. |
| 7,658,843 | B2 | | 2/2010 | Krock et al. |
| 7,694,513 | B2 | | 4/2010 | Steenstrup et al. |
| 7,728,453 | B2 | | 6/2010 | Evans |
| 7,900,571 | B2 | | 3/2011 | Jaber et al. |
| 8,564,151 | B1 | * | 10/2013 | Huebner ......................... 290/53 |
| 8,650,869 | B1 | | 2/2014 | McCormick |
| 2003/0010691 | A1 | | 1/2003 | Broussard |
| 2003/0121408 | A1 | | 7/2003 | Linerode et al. |
| 2006/0112871 | A1 | | 6/2006 | Dyhrberg |
| 2006/0283802 | A1 | | 12/2006 | Gordon |
| 2007/0108112 | A1 | | 5/2007 | Jones et al. |
| 2007/0130929 | A1 | * | 6/2007 | Khan et al. ...................... 60/398 |
| 2007/0200353 | A1 | * | 8/2007 | Ottersen ......................... 290/53 |
| 2009/0084296 | A1 | * | 4/2009 | McCormick ................... 114/26 |
| 2010/0054961 | A1 | | 3/2010 | Palecek et al. |
| 2010/0320759 | A1 | | 12/2010 | Lightfoot et al. |
| 2011/0299927 | A1 | | 12/2011 | McCormick et al. |
| 2012/0025532 | A1 | * | 2/2012 | Song .............................. 290/53 |
| 2012/0067820 | A1 | | 3/2012 | Henthorne et al. |
| 2013/0008158 | A1 | | 1/2013 | Hon |

FOREIGN PATENT DOCUMENTS

| | | |
|---|---|---|
| FR | 2437507 | 4/1980 |
| GB | 2113311 | 8/1983 |
| GB | 2459112 | 10/2009 |
| JP | 2002142498 | 5/2002 |
| KR | 20110020077 | 3/2011 |
| WO | WO 95/10706 | 4/1995 |
| WO | WO 01/96738 | 12/2001 |
| WO | WO 03/026954 | 4/2003 |

OTHER PUBLICATIONS

Blevins, Robert D., "Flow-Induced Vibrations," Van Nostrand Reinhold, New York, 1990, pp. 194-213.

Budar, et al., "A Resonant Point Absorber of Ocean-Wave Power," Nature, vol. 256, Aug. 1975, pp. 478-480.

Cébron, et al., "Vortex-Induced Vibrations Using Wake Oscillator Model Comparison on 2D Response with Experiments," Institute of Thermomechanics, Prague, 2008.

Falnes, Johannes, "Ocean Waves Oscillating Systems," Cambridge University Press, pp. 196-224, 2002.

Farshidianfar, et al., "The Lock-in Phenomenon in VIV Using a Modified Wake Oscillator Model for Both High and Low Mass-Damping Ratio," Iranian Journal of Mechanical Engineering, vol. 10, No. 2, Sep. 2009.

Garnaud, et al, "Comparison of Wave Power Extraction by a Compact Array of Small Buoys and by a Large Buoy," Proceedings of the 8th European Wave and Tidal Energy Conference, Uppsala, Sweden, 2009, pp. 934-942.

Jauvitis, et al., The Effect of Two Degrees of Freedom on Vortex-Induced Vibration at Low Mass and Damping,: J. Fluid Mechanics, vol. 509, 2004, pp. 23-62.

Lee, et al., "On the Floating Breakwater—A New Arrangement," Proceedings, International Conf. on Coastal Engineering, Taipei, 1986, pp. 2017-2022.

Leong, et al., "Two-Degree-of-Freedom Vortex-Induced Vibration of a Pivoted Cylinder Below Critical Mass Ratio," Proceedings of the Royal Society A, vol. 464, 2008, pp. 2907-2927.

Liang, et al., "A Study of Spar Buoy Floating Breakwater," Ocean Engineering, vol. 31, 2004, pp. 43-60.

McCormick, et al., "Full-Scale Experimental Study of Bi-Modal Buoy," Report EW 01-11, Department of Naval Architecture and Ocean Engineering, U.S. Naval Academy, Jun. 2011, 32 pages.

McCormick, et al., "Planing Characteristics of Fast-Water Buoys," Journal of the Waterways Harbors and Coastal and Engineering Division, vol. 99, No. WW4, Nov. 1973, pp. 485-493.

McCormick, et al., "Prototype Study of a Passive Wave-Energy Attenuating Bi-Modal Buoy," Murtech, Inc. Report M-12-1, Jan. 2012, 26 pages.

Miles, John W., "On the Interference Factors for Finned Bodies," J. Aeronautical Sciences, vol. 19, No. 4, Apr. 1952, p. 287.

Murali, et al., "Performance of Cage Floating Breakwater," Journal of Waterway, Port, Costal and Ocean Engineering, Jul./Aug. 1997, pp. 1-8.

Ng, et al., "An Examination of Wake Oscillator Models for Vortex-Induced Vibrations," Naval Undersea Warfare Center Division, Newport, RI, Technical Report 11,298, Aug. 1, 2011, 18 pages.

Ogink, et al., "A Wake Oscillator With Frequency Dependent Coupling for the Modeling of Vortex-Induced Vibration," Journal of Sound and Vibration, No. 329, 2010, pp. 5452-5473.

Rodenbusch, George, "Response of a Pendulum Spar to 2-Dimensional Random Waves and a Uniform Current," Massachusetts Institute of Technology and Woods Hole Oceanographic Institution, Engineering Program, Ph.D. Dissertation, Aug. 1978, 138 pages.

Ryan, et. al., "Energy Transfer in a Vortex Induced Vibrating Tethered Cylinder System", Conf. on Bluff Body Wakes and Vortex-Induced Vibrations, Port Douglas, Australia, Dec. 2002, 4 pages.

Shiguemoto, et al., "Vortex Induced Motions of Subsurface Buoy with a Vertical Riser: A Comparison Between Two Phenomenological Models" Proceedings, 23° Congresso Nacional de Transporte Aquaviário, Construção Naval e Offshore, Rio de Janeiro, Oct. 25-29, 2010, pp. 1-9.

Sobey, et al., "Hydrodynamic of Circular Piles," Proceedings, 6th Australian Hydraulics and Fluid Mechanics Conference, Adelaide, Dec. 1977, pp. 253-256.

(56) References Cited

OTHER PUBLICATIONS

Long Beach Water Department, Under-Ocean Floor Seawater intake and Discharge Test Plan, Apr. 1, 2009.

Lovo, Robert, "Initial Evaluation of the Subfloor Water Intake Structure System (SWISS) vs. Conventional Multimedia Pretreatment Techniques," Assistance Agreement No. 98-FC-81-0044, Desalination Research and Development Program Report No. 66, U.S. Dept. of Interior, May 2001.

McCormick, "Ocean Wave Energy Conversion," Wiley-Interscience, New York (1981, reprinted by Dover Publication, Long Island, New York in 2007).

WateReuse Association, "Overview of Desalination Plan Intake Alternatives", Mar. 2011.

International Search Report for corresponding PCT Application No. PCT/US2013/059175 dated Mar. 19, 2014.

International Search Report for related PCT Application No. PCT/US2013/048906 dated Sep. 30, 2013.

* cited by examiner

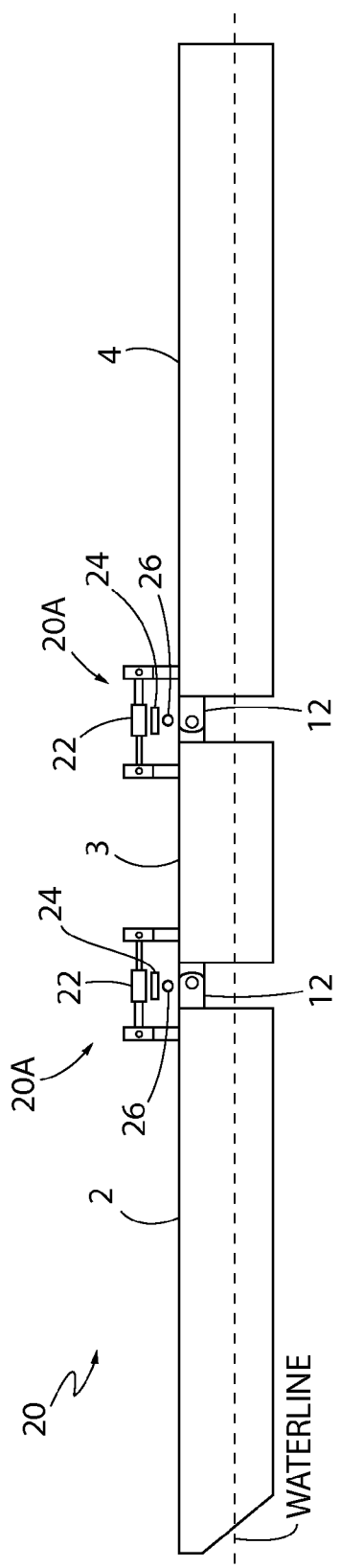
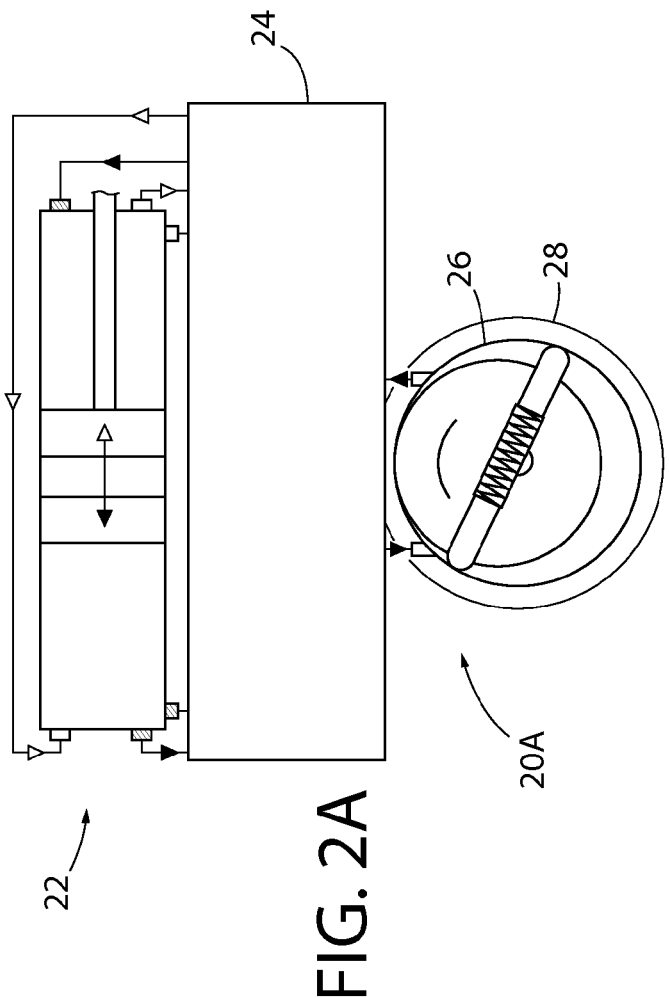
FIG. 2
FIG. 2A

US 8,866,321 B2

ARTICULATED-RAFT/ROTARY-VANE PUMP GENERATOR SYSTEM

CROSS REFERENCE TO RELATED APPLICATIONS

This utility application claims the benefit under 35 U.S.C. §119(e) of Provisional Application Ser. No. 61/707,266 filed on Sep. 28, 2012 entitled ARTICULATED-RAFT/ROTARY-VANE PUMP GENERATOR SYSTEM and whose entire disclosure is incorporated by reference herein.

FIELD OF THE INVENTION

This invention relates generally to devices for wave energy conversion and more particularly to a wave energy conversion device that uses a flow rectifier to drive an electrical generator.

BACKGROUND OF THE INVENTION

Ocean wave-energy conversion is directed to the exploitation of ocean wave energy to produce energy in one or more of four forms, those being hydraulic, pneumatic, mechanical or electrical. See McCormick, "Ocean Wave Energy Conversion," published by Wiley-Interscience, New York (1981, reprinted by Dover Publication, Long Island, N.Y. in 2007). The progress in wave-energy conversion over the past three decades has been by the combination of the energy forms and the optimization of the resulting systems. The present invention is directed to the combination of an articulated-barge system and a linear-to-rotary-pump power takeoff system. This type of system is designed to be coupled to a direct current electrical generator.

The articulated-barge wave-energy conversion system dates back to the 1970's when both Sir Christopher in the United Kingdom and Glen Hagen of the United States suggested the system. The system was studied in the late 1970's by P. Haren (1978) at MIT. He found that the optimum articulated-barge configuration was a three-barge system. In the 1980's, Dr. Peter McCabe showed that the efficiency of the three-barge system could be substantially improved by suspending an inertial-damping plate below the center barge. Dr. McCabe, then, produced a prototype of the system, coined the McCabe Wave Pump (MWP), which was deployed and studied in the Shannon Estuary for approximately nine years. See U.S. Pat. No. 5,132,550 (McCabe). The MWP was primarily designed as a producer of potable water.

In 2005, Ocean Energy Systems (OES) was formed in the United States to design and manufacture an articulated-barge system to produce potable water by reverse-osmosis (RO) desalination of sea water; See also U.S. Patent Publication No. 2009/0084296 (McCormick) describing a system directed to a wave-powered device having enhanced motion. Referring to FIG. 1, the high-pressure pumps connecting the barge-pairs are designed to draw in the water through a pre-filter, pressurize the water, and deliver the water to a RO desalination system. The system sketched in FIG. 1 is called the "articulate [barge] wave-energy converter system" or AWECS. See also U.S. Patent Publication No. 2010/0320759 (Lightfoot, et al.).

However, there remains a need for an articulate-barge system, similar to the AWECS and the MWP, that convert wave energy into electrical energy using a commercially-available rotary-vane pump.

SUMMARY OF THE INVENTION

An apparatus for generating electricity from ocean wave energy is disclosed. The apparatus comprises: a floating device having a first portion (e.g., a first barge) movably coupled (e.g., hinged) to a second portion (e.g., a second barge); at least one hydraulic pump coupled (e.g., a linear pump) between the first portion the said second portion, the hydraulic pump driving a hydraulic fluid therein when the first portion moves with respect to the second portion due to ocean wave energy; a fluid rectifier, in fluid communication with the at least one hydraulic pump, that generates a unidirectional hydraulic fluid flow; a rotary vane pump, coupled to the fluid rectifier, that uses the unidirectional flow to generate a rotational motion via a drive member; and a rotating electrical generator (e.g., a DC generator) that is coupled to said drive member, said drive member causing the rotating electrical generator to generate electricity when said drive member is rotating.

A method for generating electricity from ocean wave energy is disclosed. The method comprises: providing a floating device having a first portion (e.g., a first barge) that is movably coupled (e.g., hinged) to a second portion (e.g., a second barge); coupling at least one hydraulic pump (e.g., a linear pump) between the first portion and the second portion such that movement of the first portion with respect to the second portion, when the floating device is exposed to ocean wave energy, causes a hydraulic fluid therein to be displaced; passing the displaced hydraulic fluid through a flow rectifier that generates a unidirectional hydraulic fluid flow; directing the unidirectional hydraulic fluid flow through a rotary vane pump to cause rotational motion via a drive member; and coupling the drive member to a rotating electrical generator (e.g., a DC generator) to generate electricity when the drive member is rotating.

DESCRIPTION OF THE DRAWING

FIG. 2 is a side view of the invention of the present application;

FIG. 2A is a side view of a bi-directional pump for powering a rotary-vane pump for electrical generation of the present invention.

DETAILED DESCRIPTION OF THE PREFERRED EMBODIMENT

In the following sections, the analysis of the electrical power production by a rotary-vane/dc-generator system is first presented. Then, the power produced by the performance of this hydro-electric system when driven by the articulated-raft system is discussed.

Figure 1:
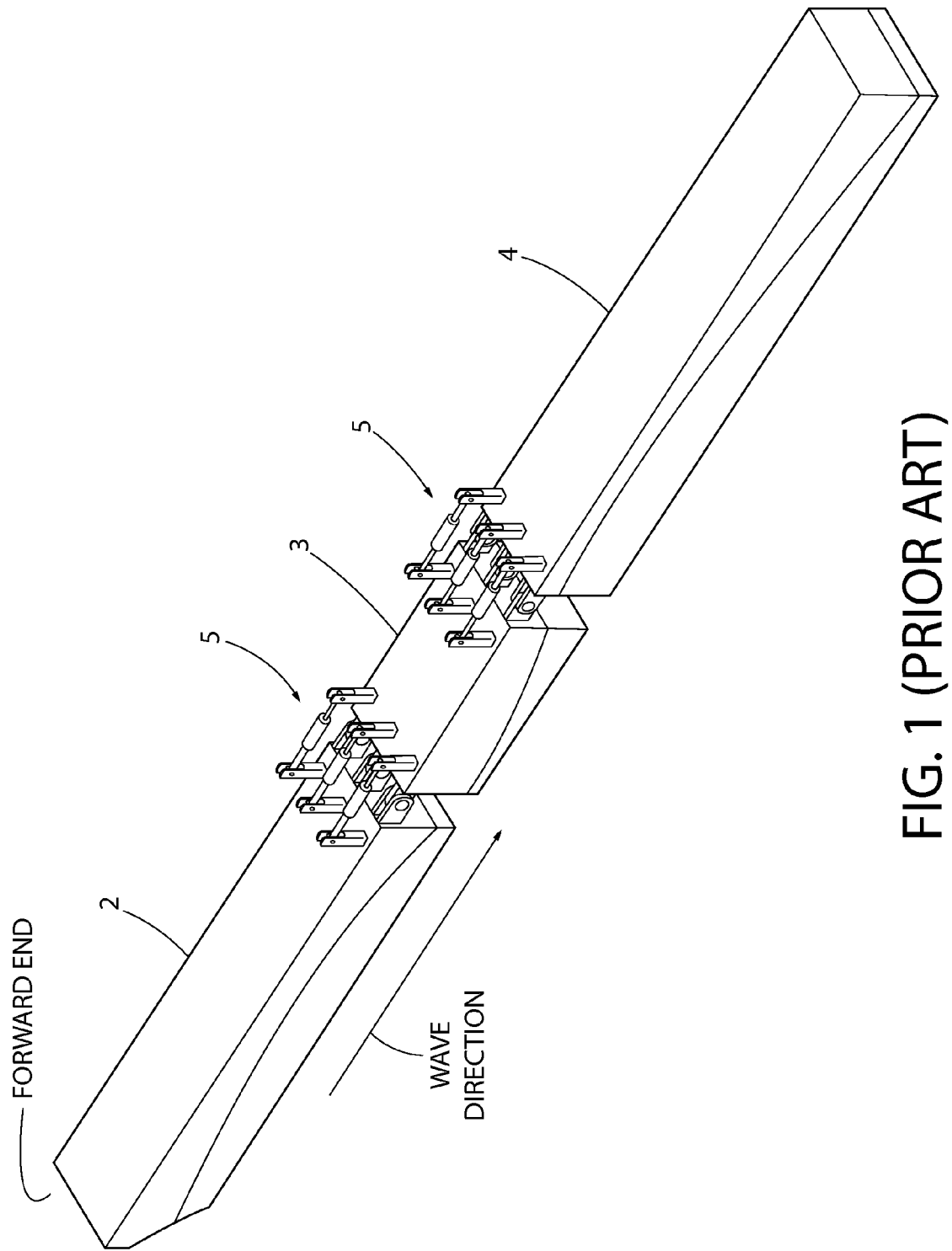
FIG. 1 is an isometric view of a prior art articulate barge wave-energy converter system (AWECS)

As shown in FIG. 1, an AWECS uses a plurality of pneumatic or hydraulic pumps 5 (hereinafter, "hydraulic" is used, it being understood that "pneumatic" is also interchangeable with "hydraulic") that straddle the two articulating barges, a forward barge 2 and a rear barge 4 which are coupled together, e.g. by hinges. As an incoming wave makes contact with the forward barge 2 first, the hydraulic fluid in the pumps coupled between the forward barge 2 and the center barge 3 are driven in a first direction; as the wave continues, the hydraulic fluid in the pumps coupled between the rear barge 4 and the center barge 3 are driven in a second opposite direction. The end results are bi-directional hydraulic pumps. However, it is desirable to convert such bi-directional hydraulic pump operation into a uniflow configuration such that a power take-off system can be engaged which can be a turbine or pump, e.g., rotary pressure pumps can be used.

Rotary Vane Pumps Powered by Linear Pumps

There are a number of types of rotary pressure pumps available for electrical generation. These include Internal Gear Pumps, Rotary-Vane Pumps Flexible Member Pumps, External Gear Pumps, Lobe Pumps and Circumferential Piston Pumps. The first three of the six are more desirable for wave-energy application since they have a single rotor. Of those, the Rotary-Vane Pump has been judged to be the most suitable.

Since the Rotary-Vane Pump is designed to turn in one rotational direction (either positive or negative), the power transfer from the linear, bi-directional pumps between the barges 2/4 in FIG. 1 presents a problem. To solve this problem, the Applicant has filed U.S. application Ser. No. 12/794, 937 filed Jun. 8, 2010, entitled "Automatic Hydraulic/Pneumatic Flow Rectifier for Bi-Directional Pumps" and whose entire disclosure is incorporated by reference herein. The concept of the present invention 20 is a modified AWECS comprising a bi-directional linear pump 22 that is powered by the relative motions of the barges 2/4, as illustrated in FIG. 2, via their movable coupling, e.g., hinges 12, with the center portion 3. Then, through a flow-rectifying control system 24, the fluid from the linear-motion pumps is fed into an intake of the rotary-vane pump 26, then returned to the pump 26 via the exhaust (not shown) of the rotary-vane pump 26. Hence, over one complete cycle (wave period), most of the hydraulic fluid is transferred through the hydraulic system. FIG. 2A is enlargement of the pump 22/flow rectifier 24 coupled to the rotary-vane pump 26, forming assembly 20A.

Figure 3:
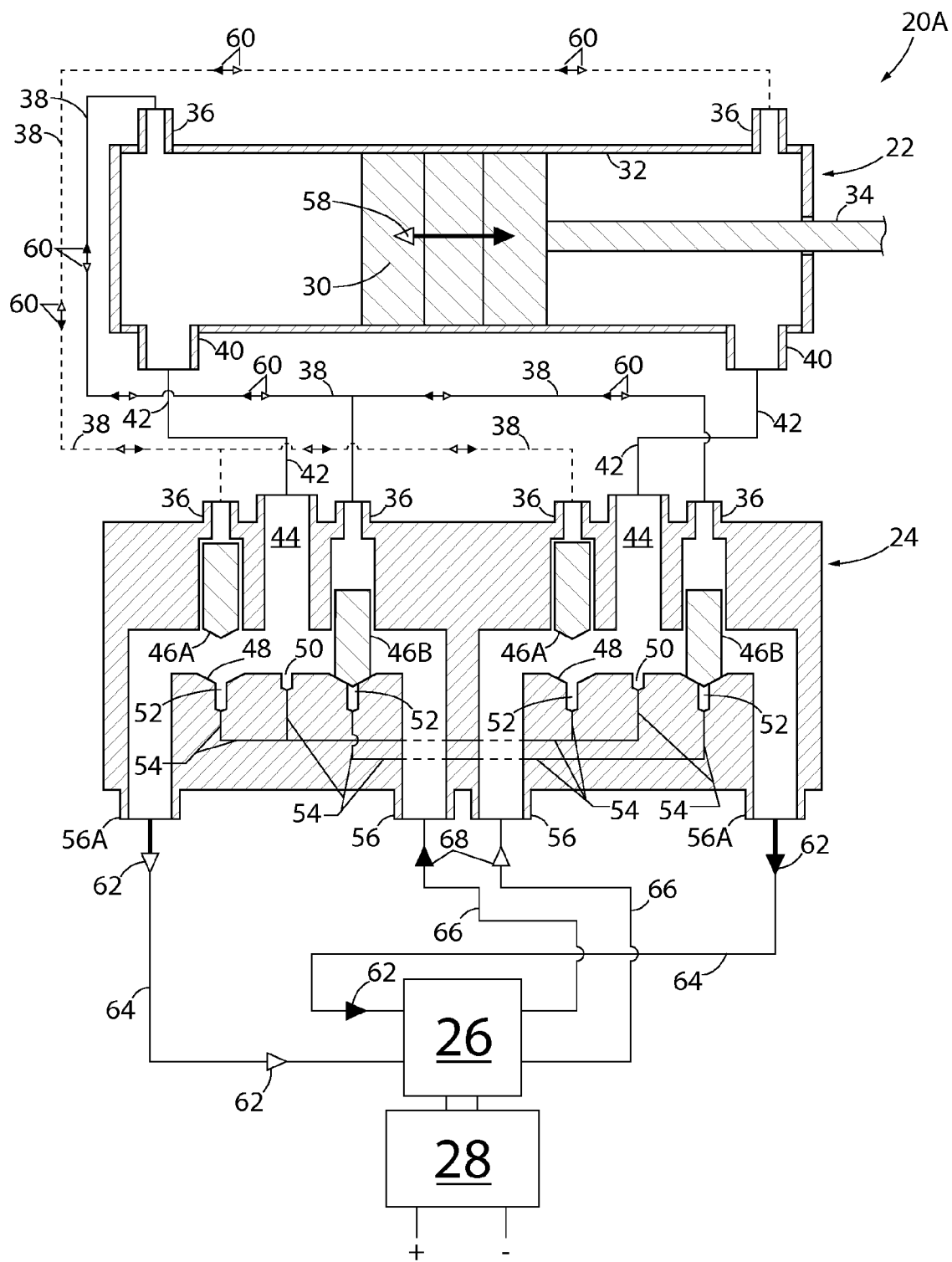
FIG. 3 is a functional diagram of an exemplary flow-rectifying control system coupled with a bi-directional pump of the present invention for actuating the rotary-vane pump to drive an electrical generator, e.g., a DC generator, of the present invention.

FIG. 3 is a functional diagram of the modified AWECS pump/rectifier and rotary-vane pump operation assembly 20A for use in the present invention. In particular, the assembly 20A comprises the bi-directional linear pump 22 that is powered by the relative motions of the barges 2/3 or 3/4 via movable couplings (e.g., hinges). As can be appreciated from FIG. 3, movement of a piston 30 within a piston chamber 32 as driven by a piston rod 34 whose other end (not shown) is coupled to either barge 2 or 4, causes an operating fluid (not shown, e.g., hydraulic fluid, any environmentally-benign oil, water, air, etc.) to be driven out of the piston chamber 32 (on either side of the piston 30), as will be described later, through the flow rectifier 24 and into the rotary-vane pump 26 and then returned. Thus, the assembly 20A forms a closed fluid system. The housing 32 comprises pressure taps 36 that feed into corresponding pressure tap pairs 36 in the flow rectifier 24 via control pressure lines 38. Intake/Exhaust taps 40 are coupled via intake/exhaust lines 42 respectively to rectifier passageways 44. Rectifier valve pairs 46A and 46B (e.g., cone-head valves) correspond to the pressure tap pairs 36. The valves 46A/46B are received in valve seats 48 when the valves are closed. Pressure relief taps 50 are provided and wherein seat pressure relief taps 52 are coupled via pressure relief lines 54. Flow ports 56 receive the return flow of the operational fluid from the rotary-vane pump 26, while flow ports 56A are the flow ports for delivering the operating uniflow to the rotary vane pump 26. Arrows 58 indicate the corresponding piston motion direction while arrows 60 indicate the pressure-force direction. Arrows 62 indicate the direction of the unidirectional operating fluid flow for driving the rotary-vane pump 26. The high-pressure operating fluid feed flow line is indicated by 64 while the low-pressure return flow line is indicated by 66.

In operation, the piston/rod assembly 30/34 is excited by an alternating energy source, namely, the water waves. The piston/rod assembly 30/34 travels in alternating directions over the period associated with the water wave in the piston housing 32. The motions create alternating pressures in the taps 36 due to the alternating piston-rod assembly motions 58. The alternating pressures are transmitted through the control pressure lines 60, producing alternating pressure forces with directions shown as 60. The piston-rod assembly motions 58 cause the operating fluid in the pump 22 to be alternatively expelled at high pressure and refilled at low pressure through the intake/exhaust taps 40. The alternating flows through the taps 40 are transmitted through the intake/exhaust lines 42. The pressure forces 60 in the control pressure lines 38 alternately cause the cone-head valves 46A and 46B to open and close. The cone-head of the valves mate with the conical valve seats 48 when the valve is closed. When the valve is to be opened by the pressure force 60, operating fluid is passed into the seat 48 through the seat pressure relief tap 52 which is partially supplied by the pressure relief tap 50. The taps 48 and 50 are interconnected by the pressure relief lines 54. The resulting flows are as follows. In particular, the high pressure flow in the high pressure feed flow lines 64 travel in the direction 62. The low pressure flow in the low pressure intake flow lines 66 in the direction 68 forms the return from the rotary-vane pump 26.

As can also be seen in FIG. 3, the rotary-pump 26 is coupled to, and drives, a direct-current (DC) generator 28. The generator is matched to the power output from the rotary pump 26. To gain an idea of the output, consider the following: The linear pump 22 of FIG. 2 has an inside diameter of 0.305 m and a half-stroke of 1 m. The pump 22 is located 1.22 m above the hinges connecting the barges 2/4. For the half-stroke of 1 m, the barges 2/4 must undergo pitching motions having an amplitude of about 11.1° in the design sea having an 8-second period and 2.5-meter wave height. A single pump 22 would, then, pump an average of 75 $m^3$/hr. A commercially-available rotary-vane pump 26 operating at 600 rpm at a flow-rate of 230 $m^3$/hr at a pressure difference of 20 bar will produce approximately 130 kW of hydraulic power. Hence, this rotary pump 26 would require three linear pumps to supply the rated flow-rate. For a ten-pump system, an average power of 433 kW would be available to power the DC generators. Operating at a hydraulic-to-electrical conversion efficiency of 80%, 346 kW of dc electricity would be available.

For citizens in the developed western countries, such as Ireland, the mean electrical power requirement is about 1 kW. For a household, the requirement is 5 kW. Based on the 346 kW average power supplied by 10-meter wide modified AWECS 20 deployed in a 2.5-meter, 8-second sea, which is what might be expected off of the west coast of Ireland, 346 citizens would be supplied electricity by a single modified AWECS 20, or approximately 70 households.

A hybrid (not shown) of the modified AWECS 20 may comprise using the forward barge-pair 2 and 3 to supply electricity and using the after barge-pair 3 and 4 to supply potable water. This hybrid would supply 171 kW of electricity and 1,000 $m^3$ per day of potable water, based on a 75% reverse-osmosis efficiency.

The AWECS' technology of OES is versatile, adaptable, cost effective and environmentally friendly. Exchanging high pressure sea water pumps for linear generators on the AWECS enables clients to choose between their requirements for potable water and/or electricity.

Assuming a 30 m-wide AWECS operating in an average wave height of 2.5 meter with a 8-second period off of the Irish coast, with a wholesale purchase price from OES of $1.5 million, 20 year straight-line depreciation, 10% APR and $50,000 annual operating and maintenance expenses, potable water can be delivered to shore side for $0.67/m2 (=$2.53/1000 gallons) or electricity can delivered to the local grid for $0.09/KW-hr.

Without further elaboration the foregoing will so fully illustrate my invention that others may, by applying current or future knowledge, adopt the same for use under various conditions of service.

What is claimed is:

1. An apparatus for generating electricity from ocean wave energy, said apparatus comprising:
   a floating device having a first portion movably coupled to a second portion;
   at least one bi-directional hydraulic pump coupled between said first portion and said second portion, said bi-directional hydraulic pump driving a hydraulic fluid whenever said first portion moves with respect to said second portion due to ocean wave energy, said at least one bi-directional hydraulic pump driving the hydraulic fluid in a first flow direction when said bi-directional pump moves in a first pump direction and driving the hydraulic fluid in a second flow direction, opposite said first flow direction, when said at least one bi-directional pump moves in a second pump direction, opposite said first pump direction;
   a fluid rectifier, in fluid communication with said at least one bi-directional hydraulic pump, said fluid rectifier generating a unidirectional hydraulic fluid flow from the hydraulic fluid driven in said opposite first and second flow directions generated by said at least one bi-directional pump's opposite motions in said first and second pump, said fluid rectifier comprising a housing separate from said at least one bi-directional hydraulic pump;
   a rotary vane pump, coupled to said fluid rectifier, that uses said unidirectional flow to generate a rotational motion via a drive member; and
   a rotating electrical generator that is coupled to said drive member, said drive member causing said rotating electrical generator to generate electricity when said drive member is rotating.

2. The apparatus of claim 1 wherein said first portion comprises a first barge.

3. The apparatus of claim 2 wherein said second portion comprises a second barge and wherein said first barge is hingedly coupled to said second barge.

4. The apparatus of claim 1 wherein said at least one bi-directional hydraulic pump is a linear pump.

5. The apparatus of claim 1 wherein said rotating electrical generator is a DC generator.

6. The apparatus of claim 1 further comprising:
   a third portion movably coupled to said second portion and wherein a second bi-directional hydraulic pump is coupled between said second portion and said third portion, said second bi-directional hydraulic pump driving a second hydraulic fluid whenever said third portion moves with respect to said second portion due to ocean wave energy, said second bi-directional hydraulic pump driving the second hydraulic fluid in a third flow direction when said second bi-directional pump moves in a third pump direction and driving the second hydraulic fluid in a fourth flow direction, opposite said third flow direction, when said second bi-directional pump moves in a fourth pump direction, opposite said third pump direction;
   a second fluid rectifier, in fluid communication with said second bi-directional hydraulic pump, said second fluid rectifier generating a second unidirectional hydraulic fluid flow from the second hydraulic fluid driven in said opposite third and fourth flow directions generated by said second bi-directional pump's opposite motions in said third and fourth pump directions, said second fluid rectifier comprising a housing separate from said second bi-directional hydraulic pump;
   a second rotary vane pump, coupled to said second fluid rectifier, that uses said second unidirectional hydraulic flow to generate a rotational motion via a second drive member; and
   a second rotating electrical generator that is coupled to said second drive member, said second drive member causing said second rotating electrical generator to generate electricity when said second drive member is rotating.

7. The apparatus of claim 6 wherein said first portion comprises a first barge.

8. The apparatus of claim 7 wherein said second portion comprises a second barge and wherein said first barge and said second barge are hingedly coupled together.

9. The apparatus of claim 8 wherein said third portion comprises a third barge.

10. The apparatus of claim 9 wherein said second barge and said third barge are hingedly coupled together.

11. The apparatus of claim 6 wherein said second bi-directional hydraulic pump is a linear pump.

12. The apparatus of claim 6 wherein said second rotating electrical generator is a DC generator.

13. A method for generating electricity from ocean wave energy, said method comprising:
   providing a floating device having a first portion that is movably coupled to a second portion;
   coupling at least one bi-directional hydraulic pump between said first portion and said second portion such that movement of said first portion with respect to said second portion, when said floating device is exposed to ocean wave energy, causes said at least one bi-directional hydraulic pump to move a hydraulic fluid in two opposite directions to create two respective opposite hydraulic fluid flows;
   providing a fluid rectifier separate from said at least one bi-directional hydraulic pump and passing said two respective opposite hydraulic fluid flows through said fluid rectifier that generates a unidirectional hydraulic fluid flow;
   directing said unidirectional hydraulic fluid flow through a rotary vane pump to cause rotational motion via a drive member; and
   coupling said drive member to a rotating electrical generator to generate electricity when said drive member is rotating.

14. The method of claim 13 wherein said step of movably coupling first portion to said second portion comprises hingedly coupling said first portion to said second portion.

15. The method of claim 13 wherein said step of coupling at least one bi-directional hydraulic pump between said first portion and said second portion comprises coupling a hydraulic pump having a piston that experiences linear displacement when said floating device is exposed to ocean wave energy.

16. The method of claim 13 wherein said step of coupling said drive member to said rotating electrical generator comprises coupling said drive member to a DC generator.

17. The method of claim 13 further comprising the steps of:
   providing a third portion movably coupled to said second portion;
   coupling a second bi-directional hydraulic pump between said second portion and said third portion such that movement of said third portion with respect to said second portion, when said floating device is exposed to ocean wave energy, causes said second bi-directional hydraulic pump to move a second hydraulic fluid in two opposite directions to create two respective opposite hydraulic fluid flows;

providing a second fluid rectifier separate from said second bi-directional hydraulic pump and passing said two respective opposite hydraulic fluid flows through said second flow rectifier that generates a second unidirectional hydraulic fluid flow;

directing said second unidirectional hydraulic fluid flow through a second rotary vane pump to cause rotational motion via a second drive member; and coupling said second drive member to a second rotating electrical generator to generate electricity when said second drive member is rotating.

18. The method of claim 17 wherein said step of movably coupling third portion to said second portion comprises hingedly coupling said third portion to said second portion.

19. The method of claim 17 wherein said step of coupling said second bi-directional hydraulic pump between said second portion and said third portion comprises coupling a second bi-directional hydraulic pump having a piston that experiences linear displacement when said floating device is exposed to ocean wave energy.

20. The method of claim 17 wherein said step of coupling said second drive member to said second rotating electrical generator comprises coupling said drive member to a second DC generator.

* * * * *